INVENTOR.
WILBUR C. DE GRAFF
BY Hudson, Boughton,
Williams, David & Hoffman
ATTORNEYS Jan. 24, 1961
W. C. DE GRAFF
2,968,981
PROGRESSIVE STEP BAR TURNER
Filed Dec. 13, 1955
7 Sheets-Sheet 3
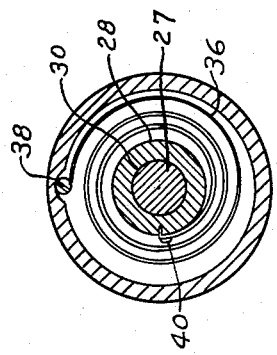
FIG. 4
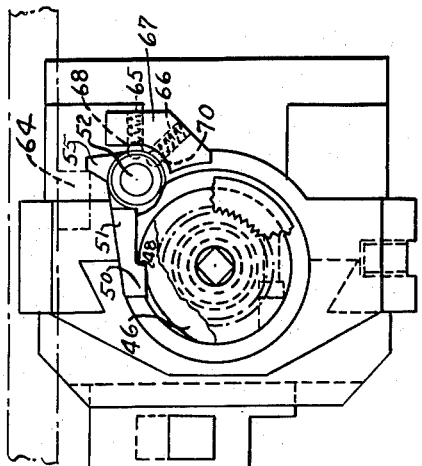
FIG. 6
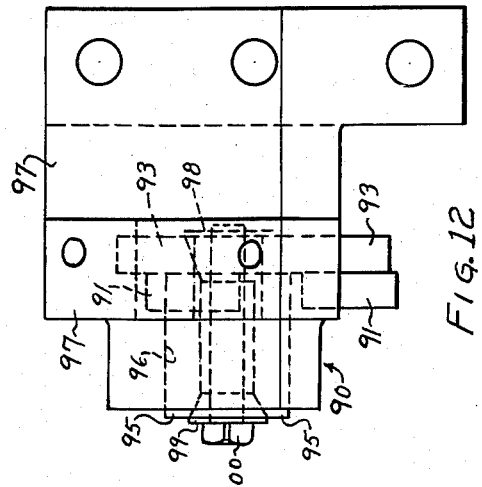
FIG. 12
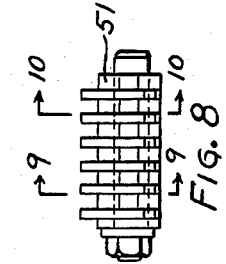
FIG. 8
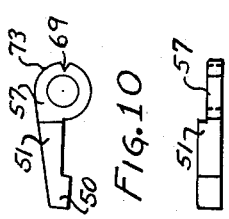
FIG. 10
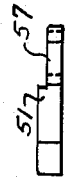
FIG. 11
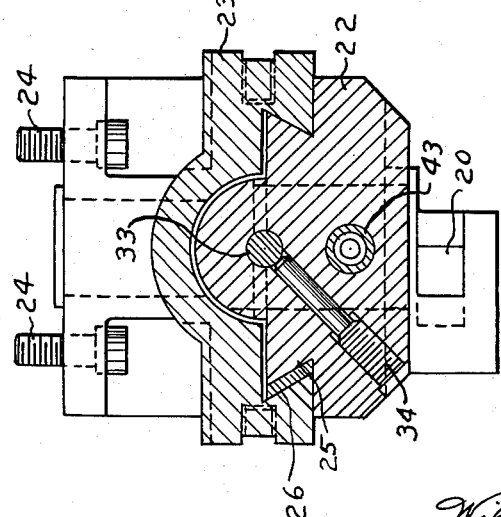
FIG. 5
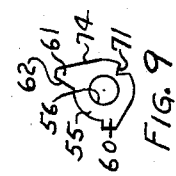
FIG. 9
FIG. 6A
FIG. 7
INVENTOR.
WILBUR C. DEGRAFF
BY Hudson, Boughton,
Williams, David & Hoffmann
ATTORNEYS

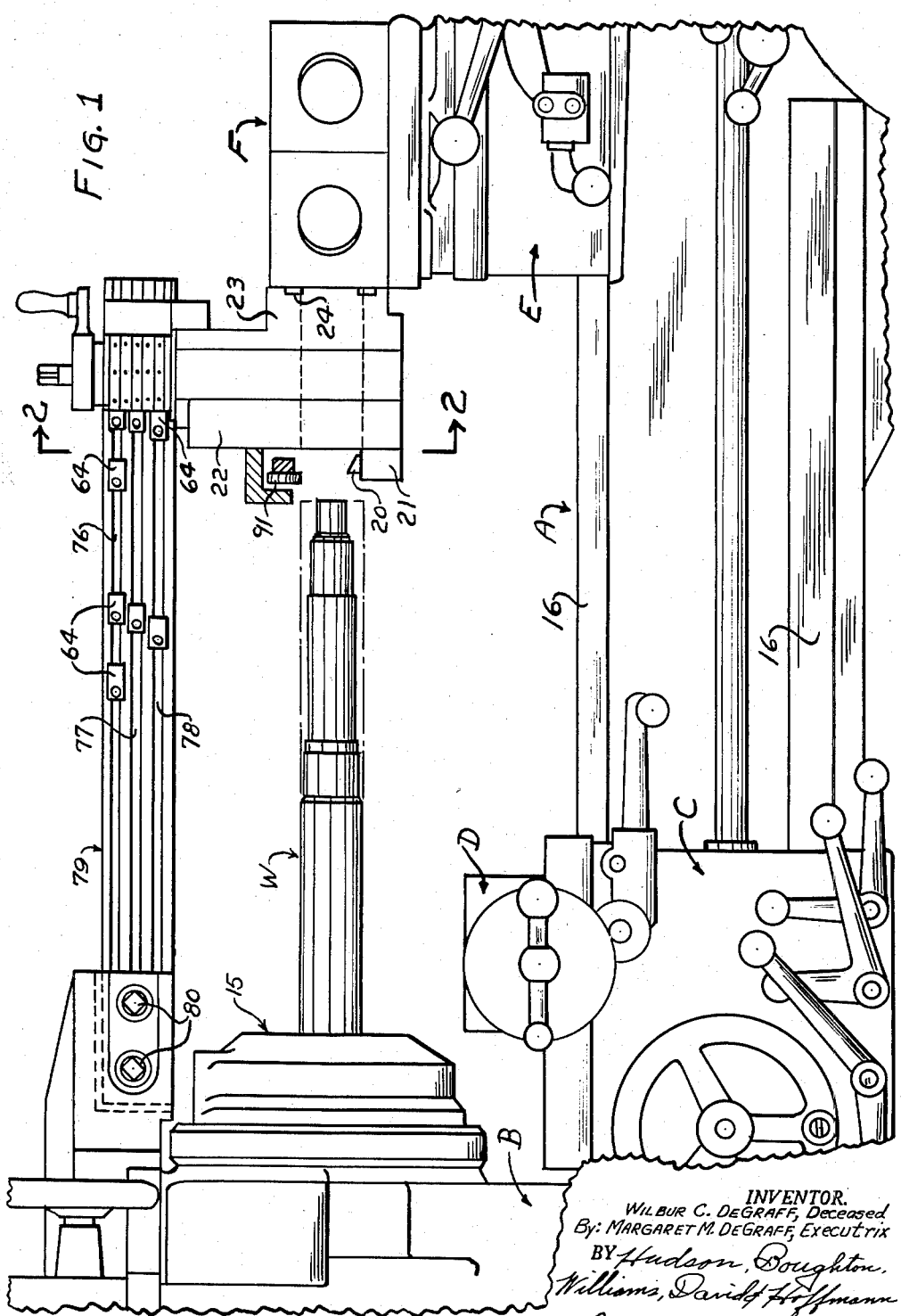

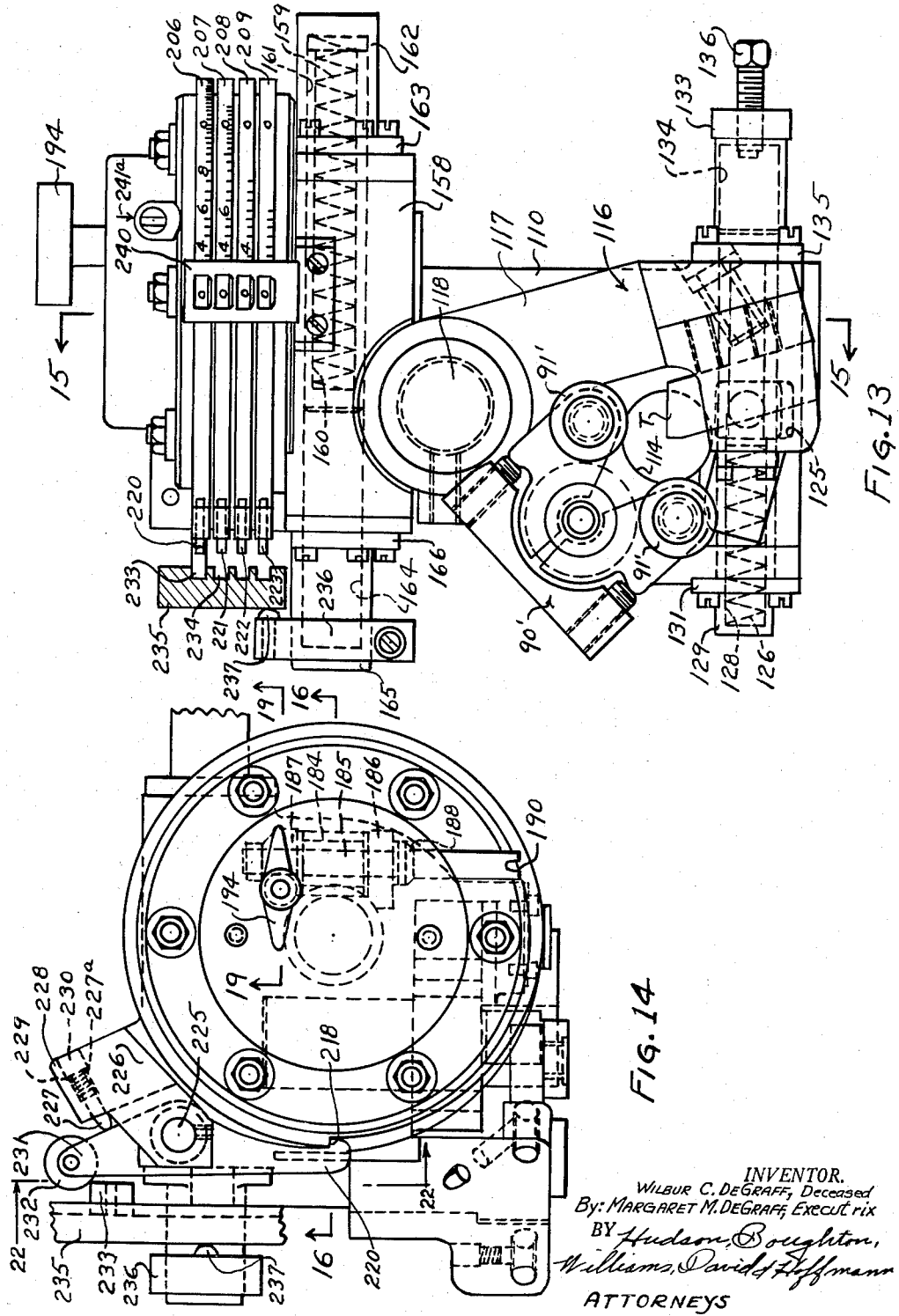

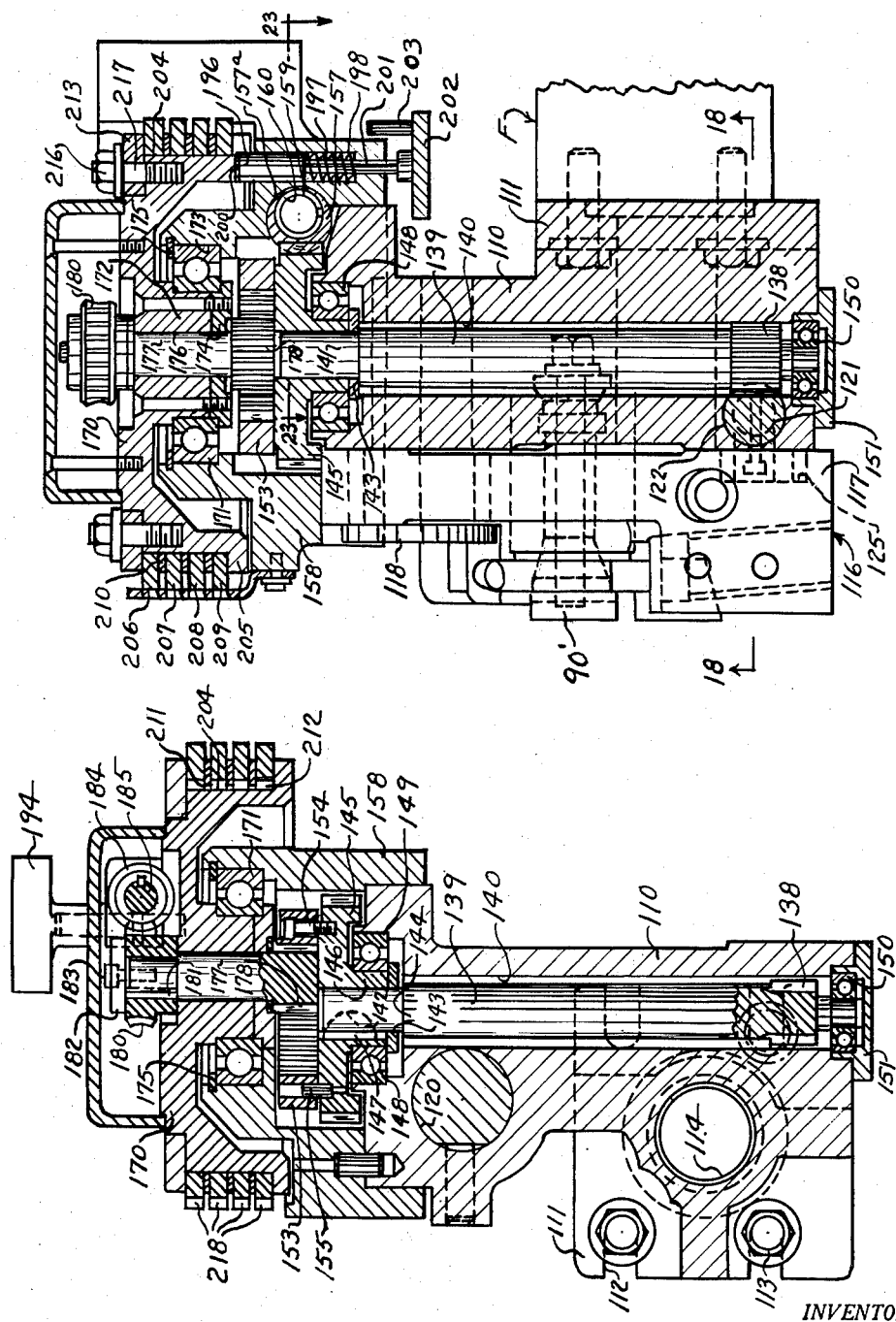

Jan. 24, 1961
W. C. DE GRAFF
2,968,981
PROGRESSIVE STEP BAR TURNER
Filed Dec. 13, 1955
7 Sheets-Sheet 6
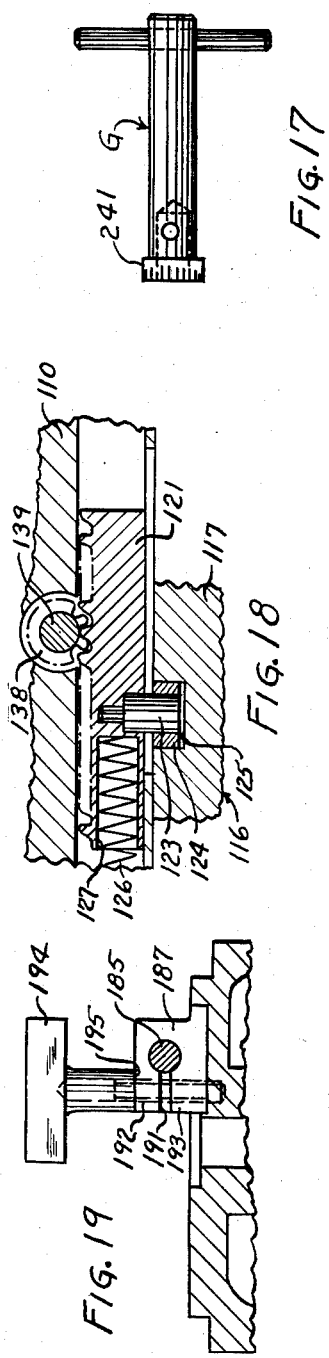
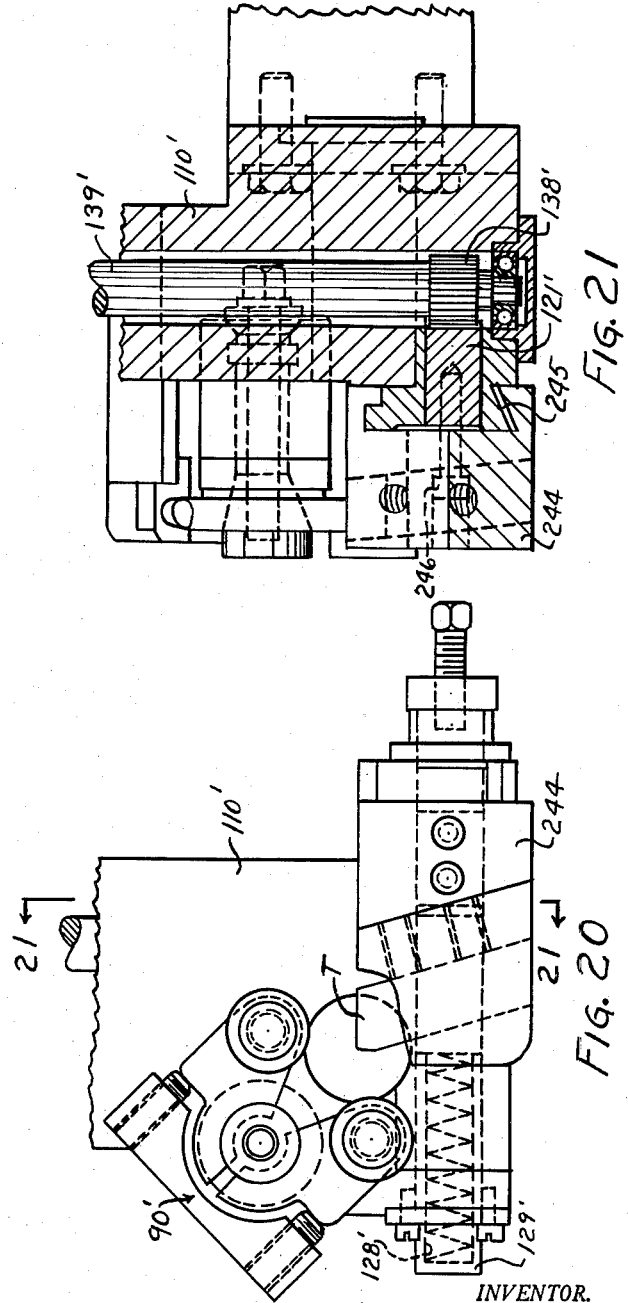
INVENTOR.
WILBUR C. DEGRAFF, Deceased
By: MARGARET M. DEGRAFF, Executrix
BY Hudson, Boughton,
Williams, David & Hoffmann
ATTORNEYS Jan. 24, 1961 W. C. DE GRAFF 2,968,981
PROGRESSIVE STEP BAR TURNER
Filed Dec. 13, 1955 7 Sheets-Sheet 7

INVENTOR.
WILBUR C. DEGRAFF, Deceased
MARGARET M. DEGRAFF, Executrix.
BY
Williams, Hudson, Boughton, David & Hoffmann
ATTORNEYS

United States Patent Office 2,968,981
Patented Jan. 24, 1961

2,968,981

PROGRESSIVE STEP BAR TURNER

Wilbur C. De Graff, deceased, late of Chagrin Falls, Ohio, by Margaret M. De Graff, executrix, Chagrin Falls, Ohio, assignor to The Warner & Swasey Company, Cleveland, Ohio, a corporation of Ohio Filed Dec. 13, 1955, Ser. No. 552,956

19 Claims. (Cl. 82—11)

The present invention relates to machine tools and, more particularly to lathes having mechanism for automatically positioning the cutting tool thereof as the tool is fed parallel to the axis of the work. This application is a continuation-in-part of my copending application Serial No. 476,305, filed December 20, 1954, now abandoned.

The principal object of the present invention is to provide a new and improved lathe in which the tool supporting member has a traverse movement parallel to the work axis and is accurately, positively and quickly positioned along a line of movement generally transverse to the work axis by means responsive to the position of the tool along the path of its traverse movement, the means being so constructed and arranged that it may be quickly and easily preset to automatically move the tool support in a manner to progressively machine steps of desired predetermined heights at various points along the axis of the workpiece.

Another object of the present invention is to provide a new and improved machine tool, particularly a lathe, in which relative feed movement in one direction is produced between a work supporting member and a tool supporting member to machine a workpiece and in which the tool supporting or work supporting member is successively moved along a line extending in a second direction to a plurality of positions by the actuation of a latch means which when released permits the operation of a motor means tending to continuously move the member in the second direction, the latch means being successively actuatable by means responsive to the relative position of the tool and work supporting members and reengaging after each actuation to stop the operation of the motor means after the member has moved a predetermined distance.

Another object of the present invention is to provide a machine tool having a tool or work holder movable with respect to the supporting member therefor by means including a spring motor carried by the holder or its supporting member, the movement of the holder being controlled by presettable latch means adapted to be successively moved between active and inactive positions to sequentially permit movement of the holder to a plurality of positions along its line of movement.

Another object of the present invention is to provide a new and improved machine tool having a tool or work supporting member movable on its support member by a mechanism including relatively rotatable nut and lead screw elements supported by different ones of the members, means tending to continuously rotate one of the elements to move the supporting member, and latch means for preventing the relative rotation of the elements and actuatable to permit a predetermined relative angular movement of the elements.

Another object of the present invention is to provide a machine tool having a tool or work supporting member movable in two angularly related directions, and power actuated means on the tool or work supporting member or the support member therefor tending to continuously move the tool or work supporting member in one direction but prevented from doing so by the engagement of one of a plurality of latching levers adapted to operatively engage, in sequence, an element positively driven by the power actuated means to prevent operation of the power actuated means, the latching lever in engagement with the element being actuatable in response to movement of the member in its second direction to permit operation of the power actuated means until stopped by the engagement of the next latching lever whereby the tool or work supporting member may be successively moved to a plurality of positions in the one direction as it is being moved in the second direction.

Another object of the present invention is to provide a new and improved mechanism for successively moving a supported member, such as a tool slide, to a plurality of positions relative to its supporting member, the movement of the supported member being obtained by the rotation of one of the elements of nut and screw elements connected between the members by a power means tending to continuously rotate the rotatable element, and the rotatable element having a plurality of stacked rings with angularly spaced abutments on the periphery thereof positively connected to the rotatable element for rotation therewith, the abutments being sequentially engageable by individual latching levers corresponding to each abutment to prevent rotation of the rotatable element whereby the levers may be successively actuated to permit the power means to successively move the supported member to a plurality of positions, and the movement of the supported member upon the actuation of the engaged lever being determined by the angular spacing between the abutment engaged by the engaged lever and the next abutment to be engaged.

Yet another object of the present invention is to provide a new and improved machine tool having a tool or work supporting member movable on its support member and urged along a line of movement with respect thereto by a mechanism including a spring biased rack in mesh with a pinion operatively connected to the tool or work supporting member, and latch means normally preventing the movement of the tool or work supporting member but successively actuatable to permit operation of said rack to produce successive predetermined movements of the tool or work supporting member.

A still further object of the present invention is to provide a new and improved machine tool having a tool holder supported by a member for movement toward and away from the work, the holder being continuously urged toward the work by spring means operatively connected to the holder through a mechanism which includes latch means for preventing movement of the holder by the spring means and presettable to permit successive predetermined movements of the tool holder on successive actuations of the latch means, the mechanism including means to permit movement of the tool holder towards and away from the work independently of the operation of the latch means and without disturbing the settings on the latch means, the mechanism being such that it can be again placed under the control of the latch means after movement independent of the latch means without changing the relationship between the various positions to which the tool holder is moved under the control of the settings of the latch means.

Still another object of the present invention is the provision of a new and improved tool or work holder which is supported for movement about a pivot and which is continuously urged in one direction about the pivot by the spring means operatively connected to the holder through a rack and pinion, movement of the holder about the pivot normally being prevented by latch means adapted to engage a member rotatable with the pinion and presettable to permit successive predetermined angular movements of the holder about its pivot on successive actuations of the latch means and mechanism being provided to disconnect the rotatable member from the pinion to permit movement of the holder independently of the latch means and to again connect the rotatable member to the pinion so that the original relationship between the various positions to which the holder is moved under the control of the latch means is maintained.

A further object of the present invention is the provision of a new and improved step turning attachment for a turret lathe or the like, the attachment comprising a support member adapted to be connected to the turret of the lathe, a tool supporting member carried by the support member for movement toward and away from the work when the attachment is positioned on the machine, motor means on the support or supporting member tending to continuously rotate means for moving the tool supporting member in one direction, and latch means for preventing operation of the means but successively actuatable to permit successive movements of the support member to a plurality of positions, the latch means automatically re-engaging after the desired predetermined movement upon each actuation thereof.

Further objects and advantages of the present invention will be apparent from the following detailed description of the preferred embodiments of the present invention taken in conjunction with the accompanying drawings, forming a part of this specification and in which:

Fig. 1 is a fragmentary elevational view of a turret lathe embodying the present invention;

Fig. 4 is a sectional view taken approximately along line 4—4 of Fig. 3;

Fig. 5 is a sectional view taken approximately along line 5—5 of Fig. 3;

Fig. 6 is a plan view taken approximately along line 6—6 of Fig. 3 with parts broken away;

Fig. 6a is a view of the latch of Fig. 6 in an unlocked position.

Fig. 7 is a fragmentary sectional view of the latch actuating mechanism;

Fig. 8 is a detached view of the latching mechanism of the machine illustrated in Fig. 1;

Fig. 9 is a view taken approximately along line 9—9 of Fig. 8;

Fig. 10 is a view taken approximately along line 10—10 of Fig. 8;

Fig. 11 is a plan view of a latching lever;

Fig. 12 is an elevational view of the thrust resisting means;

Fig. 13 is a side elevational view of an alternative form of the present invention;

Fig. 14 is a plan view of the apparatus of Fig. 13;

Fig. 15 is a vertical sectional view taken approximately along line 15—15 of Fig. 13;

Fig. 16 is a vertical sectional view taken approximately along line 16—16 of Fig. 14;

Fig. 17 is an elevational view of a wrench adapted for use with the present invention;

Fig. 18 is a fragmentary sectional view taken approximately along line 18—18 of Fig. 15;

Fig. 19 is a fragmentary view taken approximately along line 19—19 of Fig. 14;

Fig. 20 is a fragmentary elevational view of an alternative embodiment of the present invention;

Fig. 21 is a vertical sectional view taken approximately along line 21—21 of Fig. 20;

Figure 3:
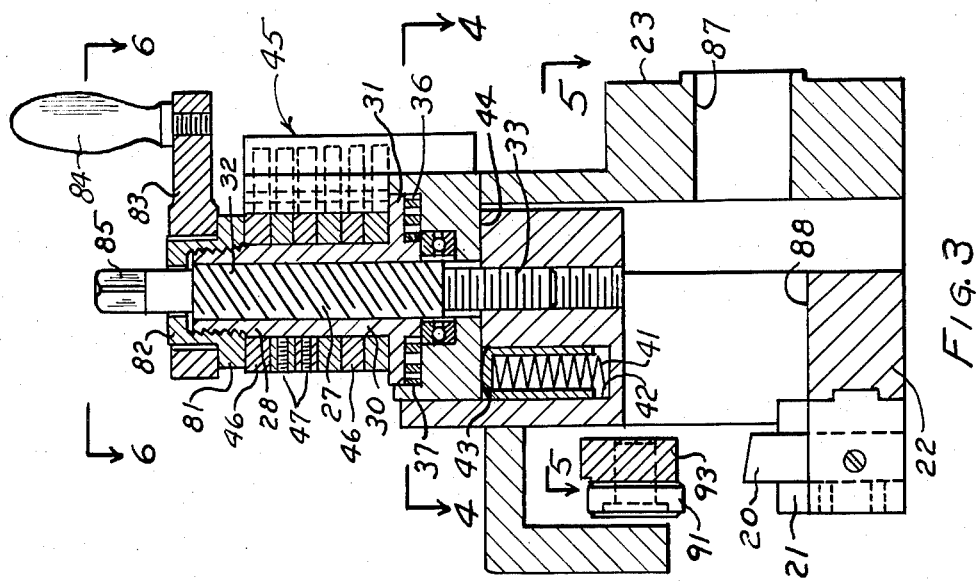
Fig. 3 is a vertical sectional view taken approximately along line 3—3 of Fig. 2.

The present invention contemplates the provision of a machine tool, particularly a lathe or like machine, having a work or tool supporting member adapted to be moved to a plurality of positions with respect to its support member by a mechanism including power actuated means tending to continuously move the supporting member and releasable latching means for preventing operation of the power actuated means and actuatable to permit operation of the power actuated means to move the supporting member a predetermined distance after which the latching means reengages to prevent further movement of the supporting member, whereby, on successive actuations of the latching means, the supporting member may be successively moved to a plurality of predetermined positions.

Although the present invention is susceptible of various modifications and of use with various types of machine tools, it is particularly adapted for use in step turning a workpiece and is herein shown as embodied in a turret lathe for automatically positioning the cutting tool transversely of the axis of the work spindle to machine a progressively stepped workpiece.

Referring to the drawings, the turret lathe illustrated comprises a bed A, a headstock B at one end of the bed A having a spindle 15 adapted to clamp and rotate a workpiece W, a cross-slide carriage C mounted on longitudinal ways 16 on the bed A for traverse or feed movement parallel to the axis of rotation of the workpiece W and having a cross-slide D mounted thereon for cross feed movement transversely of the bed A, and a saddle E movable longitudinally of the bed A on ways 16 by suitable power actuated means and having an indexible turret F supported thereon. As will be well understood by those skilled in the art, the workpiece W is adapted to be clamped and rotated by the work spindle and operated upon by a tool supported on the cross-slide D or on the turret F, and the cross-slide carriage C and the saddle E may be moved longitudinally of the bed A by suitable power actuated means to provide a relative feed movement between the work supporting and tool supporting members.

Figure 2:
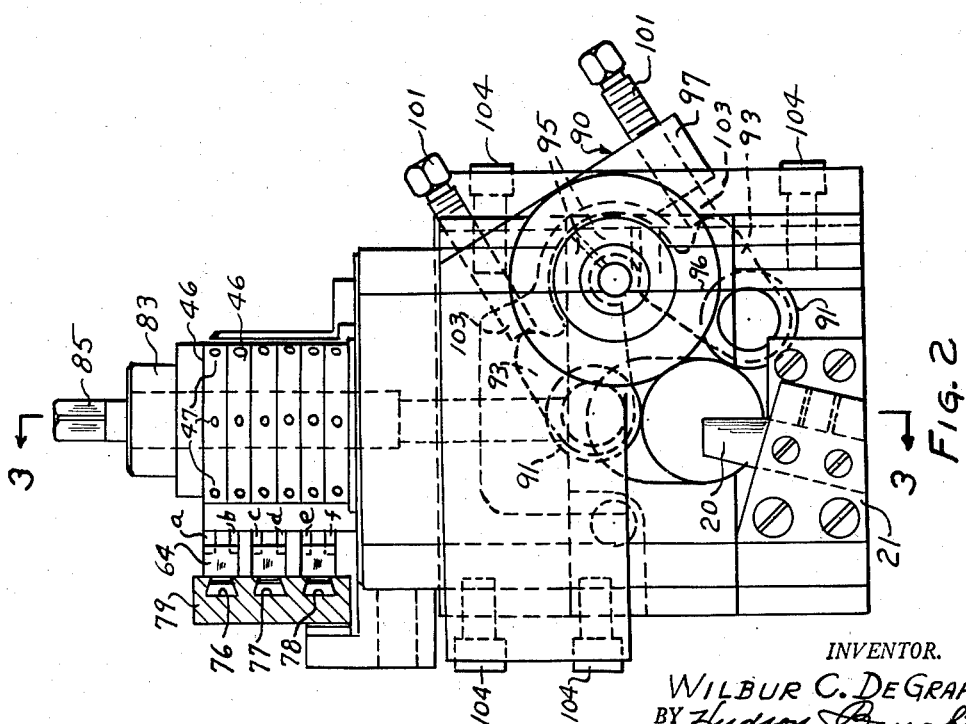
Fig. 2 is an elevational view taken approximately along line 2—2 of Fig. 1.
Figure 22:
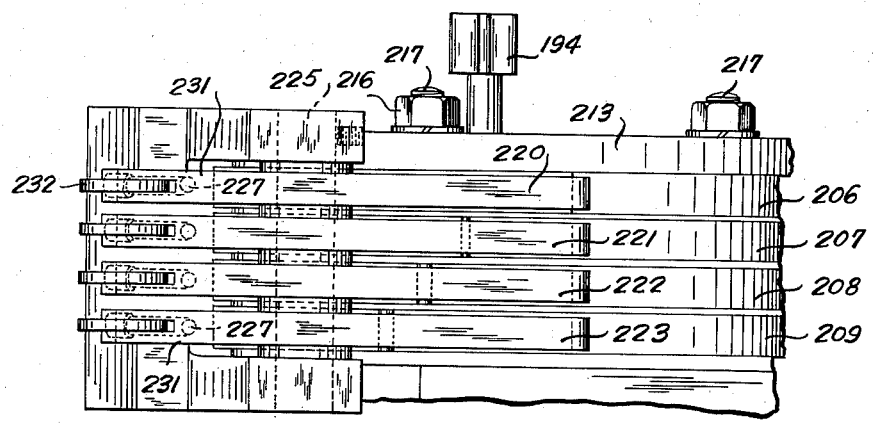
Fig. 22 is a fragmentary elevational view looking in the direction of the arrow from line 22—22 of Fig. 14.
Figure 23:
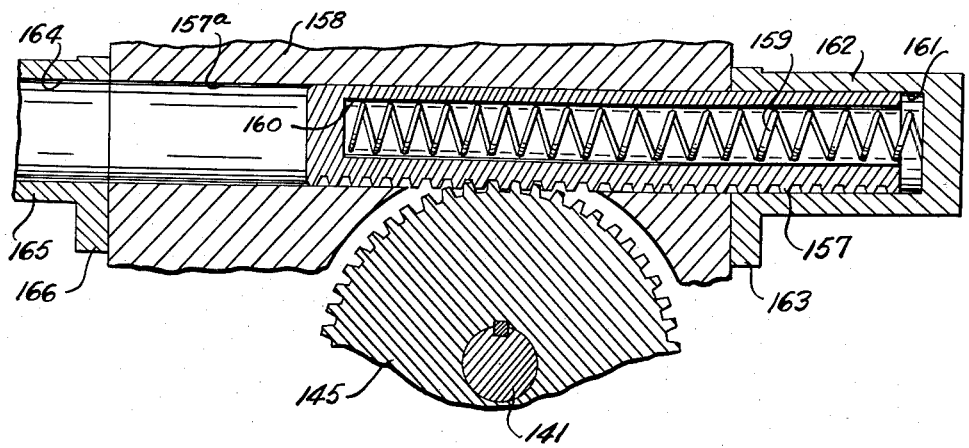
Fig. 23 is a fragmentary sectional view taken approximately along line 23—23 of Fig. 15.

In the embodiment of the present invention illustrated in Figs. 1–12, the workpiece W is adapted to be operated upon by a turning or cutting tool 20 mounted in a tool holder 21 carried by a tool supporting member or slide 22 movably supported on a slide support member 23. The slide 22 is moved with respect to the support member 23 by power means to be described in detail hereinafter. The slide support member 23 is adapted to be connected to a face of the turret F, which is, in the illustrated embodiment, a hex turret, by means of cap screws 24 which are adapted to thread into a member (not shown) positioned within the turret F to clamp the supporting member 23 thereto.

As is best illustrated in Fig. 5, the tool supporting member 22 has a dovetail slide 25 adapted to operate in a guideway 26 in the support member 23 to guide the movement of the tool supporting member 22 toward or away from the axis of rotation of a workpiece W supported in the headstock. The tool supporting member 22 is moved with respect to its support member by power actuated means comprising a lead screw 27 and its cooperating nut 28. The nut 28 comprises an elongated cylindrical body 30 with a radial flange portion 31 adjacent the lower end thereof, as viewed in Fig. 3. The nut 28 is rotatably supported by the support member 23 adjacent the upper end of guideway 26 and the threaded portion 32 of the lead screw 27 which is adapted to engage the nut 28 has a relatively steep pitch so that a relatively small angular rotation between the nut 28 and the lead screw 27 will produce a relatively large axial movement of the lead screw. The lower portion 33 of the lead screw 27 is of reduced diameter and threads into the tool supporting member 22 with the threads on the portion 33 being preferably of finer pitch than the threads on the upper portion 32. Relative rotation between the lead screw 27 and the member 22 is normally prevented by means of a setscrew 34, best shown in Fig. 5, which threads into the member 22 and engages the portion 33.

The nut 28 is adapted to be rotated to move the tool supporting member or slide 22 with respect to its support member 23 by a spiral spring 36 positioned in a recess 37 in the upper portion of the support member 23 immediately below the flange 31 of the nut 28. The spiral spring 36 is coaxial with the lead screw 27, as best shown in Fig. 4, and has one end 38 connected to the support member 23 and its inner end 40 connected to the nut 28. The spring tends to rotate the nut 28 in a direction to move the lead screw in a direction to move the tool support member 22 in a direction away from the workpiece supported in the headstock B.

The tool supporting member 22 is also urged in a direction away from the workpiece by a spring 41 positioned in a bore 42 extending parallel to the guideway 26 and opening into the upper end of the tool supporting member 22. The upper end of the spring 41 is received within a tubular member 43 closed at its upper end and slidably mounted in the bore 42, the closed end of the tubular member 43 bearing against a wall closing the upper end of the guideway 26. Spring 41 urges the member 22 downwardly and tends to cause rotation of the nut 28. A plurality of springs 41 may be used if so desired. It is now apparent that the springs 36, 41 function as motor means tending to continuously urge tool supporting member 22 in a direction away from the work which is, in the preferred and illustrated embodiment, a downward direction.

Movement of the tool supporting member 22 by the springs 41, 36 is adapted to be prevented by presettable latching means 45 adapted to engage abutments or heels on the periphery of a plurality of stacked rings 46 carried on the cylindrical body 30 of the nut 28. The stacked rings 46 are adjustably held against rotation on the body 30 of the nut 28 by setscrews 47. Each ring 46 has a cutout portion 48 forming a heel or abutment 49 adapted to be engaged by a keeper portion 50 of a pawl 51, there being a corresponding pawl 51 for each ring 46. The periphery of the rings, with the exception of the heels 49, is such that the keeper portions 50 will readily ride thereon when the rings are rotated. The pawls 51 are pivotally mounted on a common shaft 52 supported on the slide support member 23.

In operation the rings 46 are adjusted on the nut body 30 to preset the latching means 45 by loosening setscrews 47 so that the heels 49 are angularly spaced from each other. With this arrangement only one pawl 51 will be engaged at any one time and upon the release thereof the nut 28 will be free to rotate a predetermined angular distance before the heel on a different ring is engaged by another pawl.

The pawls 51 are adapted to be actuated to their released position by the operation of individual trigger members 55. The trigger members 55 are supported on the shaft 52 which passes through central openings 56 therein, and are located in a recessed portion 57 of their corresponding pawl 51. A projecting ear 60 on each trigger member 55 overlaps the non-recessed portion of the corresponding pawl 51 and will move the pawl away from the ring 46 upon rotation of the trigger member in the proper direction. The trigger member 55 also has a trigger lever 61 extending therefrom having a slanted face 62 adapted to be engaged by an actuating abutment member or dog 64 supported along the path of movement of the turret E.

The pawl 51 and the trigger member 55 are adapted to be biased toward their latched positions by springs 65, 66 respectively, one for each pawl and each trigger member. As is best shown in Fig. 6, each spring 65 is mounted opposite its corresponding pawl 51 in a bore of a member 67 mounted on the support member 23 and yieldably urges a detent ball 68 into a receiving notch or socket 69 in the periphery of its corresponding pawl 51. Each spring 66 is mounted in the member 67 in a manner similar to the spring 65 and each urges a detent ball 70 into a receiving notch or socket 71 in its corresponding trigger member 55. When a pawl 51 is in engagement with its corresponding heel 49, its detent ball 70 will yield to permit clockwise movement of the trigger member 55 about the shaft 52, as the shaft is viewed in Fig. 6, allowing the ear 60 to move the pawl 51 out of engagement with the abutment 49. It will be noted that when a pawl is lifted by the rotation of a trigger member, its detent ball 68 rides onto the side of its socket to apply force to the pawl, tending to urge it toward the ring 46. The trigger member is similarly urged by the spring 66 to its normal position since the ball detent 70 rides on a side of its socket 71 when the trigger member is rotated. The recessed portion 57 of each pawl is such as to permit the return of the trigger member 55 when the pawl is in an actuated position. It may now be seen that the tool supporting member 22 may be moved to successive positions with respect to the workpiece W and its support member by actuation of the pawls 51 to permit the springs 36 and 41 to rotate the nut 28 a predetermined amount with respect to the lead screw 27 for each actuation.

The trigger levers 61 of the pawls 51 are vertically aligned and are adapted to be actuated by abutment members or dogs 64 supported in dovetail guideways or slots 76, 77, 78 of a plate-like, dog support member 79 for adjustment along the slot. The dog support member 79 is located in a vertical plane and is, in the illustrated embodiment, supported from the headstock B by bolts 80 so that the dogs 64 will be positioned in the path of movement of the trigger levers 61 as the tool is moved axially of the workpiece W. It will be understood, of course, that the support member 79 may be mounted in any suitable manner.

The dogs in each slot 76, 77, 78 are adapted to engage two adjacent trigger members 61. In the preferred and illustrated embodiment, there are six pawls 51 and six rings 46. For the sake of convenience in the following discussion, the positions of the six pawls 51 and their corresponding rings have been designated respectively by the letters a, b, c, d, e, and f, starting from the uppermost pawl position as viewed in Figs. 1 and 2. The rings 46 are so positioned with respect to each other and with respect to the nut 28 that upon rotation of the nut the pawls in positions a, c, and e latchingly engage their corresponding rings 46 in sequence, and subsequently, the pawls in positions b, d, and f sequentially latchingly engage their corresponding rings 46. The pawls in positions a and b will be actuated by any dog 64 positioned in slot 76; the pawls in positions c and d will be actuated by any dog 64 positioned in slot 77; and the pawls 51 in positions e and f will be actuated by any dog 64 positioned in slot 78.

As may be seen from Fig. 1, a dog 64 is located in one of the slots 76, 77, 78 opposite the workpiece W so that a pawl 51 is actuated when a step is to be formed in the workpiece W. As the tool 20 is fed to the left, as viewed in Fig. 1, the dog 64 farthermost to the right in slot 76 will actuate pawls in positions a and b. Since only the pawl a is at this time in latching engagement with its corresponding ring 46, the simultaneous actuation of the pawl b will not affect the operation of the device. The actuation of pawl a, however, will allow the rotation of the nut 28 to reposition the tool 20 and form the shoulder desired. After a predetermined amount of rotation, the pawl 51 in position c will latchingly engage its corresponding ring 46 to securely hold the tool 20 in its proper position. The pawl in position c is then subsequently actuated by a dog 64 located in slot 77 to release it and permit a predetermined rotation of the nut 28 prior to engagement of the pawl in position *e* to stop the rotation of the nut and properly position the tool 20. It will be noted that the dog 64 in slot 77 which actuated the pawl in position *c* to a released position also actuated the trigger lever 61 for releasing the pawl in position *d*. This, however, had no affect since the pawl was not in latching engagement with its corresponding ring 46. The rest of the pawls latchingly engage their corresponding rings in sequence in a manner similar to that described above and when the nut has completed one complete revolution the pawl in position *a* is once again in latching engagement with its ring 46.

It will now be clear to those skilled in the art that by properly positioning the dogs 64 along the slots 76, 77, 78, that pawls 51 may be operated in a predetermined sequence to form steps at desired positions along the length of the workpiece W. While the present invention has been described with the pawls operated in a particular sequence, it is apparent that the sequence of operation and the number of dogs 64 may be varied without departing from the scope or spirit of the present invention.

Suitable means is provided for repositioning the slide member 22 upon the completion of a cutting operation and for adjusting the original position of the slide member 22 with respect to its support member 23. The means for repositioning the slide member 22 at the end of the cutting operation comprises a cap 81 threaded onto the upper end of the body 30 of the nut 28. The cap 81 is threaded onto the nut 28 to permit its removal enabling the rings 46 to be slipped off the upper end of the nut 28. The cap 81 has a reduced portion 82, and an operating lever 83 having an opening therethrough is adapted to be positioned on the reduced portion 82 and is provided with a handle 84. The operator, by rotating the handle, will cause rotation of the nut 28 to rewind the spring motor 36 and rotate the lead screw 27 to move the slide member 22 to its starting position. The initial relative position of the slide member 22 and the support member 23 may be adjusted by loosening set-screw 34 and rotating the lead screw 27 by means of a wrench adapted to fit on an irregularly shaped portion 85 at the upper end of the shaft of the lead screw 27 causing the portion 33 to thread into or out of the slide member 22.

As the turret F is moved axially of bed A, the machined workpiece will pass through an opening 87 in the slide support member 23 and through conventional openings in the turret member F. The tool supporting member or slide 22 is also provided with a cutout portion 88 to permit passage of the workpiece W without interfering with the operation of the slide or tool supporting member 22 to reposition the tool 20 when a step is to be formed.

In order to provide a support for the extended end of the workpiece W, a thrust resisting means 90 is supported from the slide support member 23. The thrust resisting means 90, in the present instance (see Fig. 12), comprises two spaced rollers 91 adapted to engage the periphery of the workpiece W ahead of the tool 20 and on the opposite side thereto. The particular means per se for supporting the rollers forms no part of the present invention and the means shown is similar to that described in Lange Patent No. 2,158,798, issued May 16, 1939, and will not, therefore, be described in detail. Suffice it to say that the rollers 91 are mounted on the lower ends of the arms 93, forming thrust resisting members. The upper ends of the arms 93 have integrally formed therewith complementary segmental sleeve portions 95 which extend into a lengthwise opening 96 in a body member 97. The opening 96 is above and to one side of and parallel with the axis of the workpiece W. The arms 93 can be rocked toward or away from each other in order to position the rollers 91 with respect to work of different diameters, and may be locked in their proper adjusted positions by means of a conical nut 98 and a conical washer 99 adapted to engage complemental conical surfaces formed at the opposite ends of the segmental sleeve portions. The nut 98 and the washer 99 are adapted to be drawn together by a bolt 100 which extends through the opening 96 and which, when turned in the proper direction, draws the nut and washer toward each other to effect a separation of the segmental sleeve portions to clamp the same in the opening 96 and, in turn, to clamp the thrust resisting members in proper position.

After the rollers 91 have been adjusted for a workpiece of a certain diameter, thrust screws 101 extending through a forwardly projecting part of the body member 97 are brought into engagement with shoulders 103 formed at the upper ends of the arms 93 for the purpose of resisting excessive thrust which might occur when heavy cuts are being taken in the workpiece.

The body member 97 is provided with a pair of arms adapted to straddle the slide support member 23 and cap screws 104 pass therethrough to connect the body member to the slide support member.

An alternative form of the present invention is illustrated in Figs. 13 through 19 of the drawings. The embodiment shown comprises a body or support member 110 including a flanged portion 111 having slots 112 therein for passing bolts 113 for securing the support member 110 to one of the faces of the hex turret F of the machine of the same general construction as the machine shown in Fig. 1. The support member 110 has an opening 114 therein for passing the workpiece W, which opening is aligned with the opening in the face of the hex turret to which the support member 110 is secured.

A rockable tool holder 116 is pivotally supported on the left-hand face of the support 110, as it is viewed in Fig. 15, for rocking movement toward, and away from, the axis of the opening 114 which passes the workpiece W. As illustrated in the drawings, the tool holder 116 comprises a member 117 which is pivoted to the support member 110 at a point above the opening 114 in approximate vertical alignment with the center of the opening 114 by a shoulder bearing pin 118 passing through the upper end of the member 117 and having a reduced portion fixed in a machined opening 120 in the support for the bearing pin 118, and while a plane bearing has been illustrated, it will be understood by those skilled in the art that a suitable antifriction bearing may be substituted. Preferably, the axis of the bearing pin 118 is offset slightly to the side of a vertical line through the axis of the opening 114 from which the holder moves toward the opening 114. The lower end of the member 117 is formed to adjustably mount a cutting tool T. The mounting for the cutting tool T may be of any conventional construction which will securely hold the cutting tool T in its adjusted position with respect to the member 117.

The tool holder 116 is rocked about the bearing pin 118 upon reciprocation of a rack bar 121 slidably supported by the support member 110 for horizontal movement transversely of the opening 114. The rack bar 121 is disposed in a bored opening 122 adjacent to the lower end of the member 117 and is operatively connected to the member 117 by a bearing pin 123 and a shoe 124. The bearing pin 123 is fixed to the rack bar 121, and the shoe 124 is received in a vertical slot 125 in the member 117 and is rockable on the bearing pin 123. It will be noted that the opening 125 permits relative vertical movement between the member 117 and the shoe 124. This is necessary inasmuch as the pin 123 moves in a straight path and the member 117 rocks in a curved path about the axis of the bearing pin 118.

The rack bar 121 and, in turn, the tool holder 116 are urged to their extreme right-hand position, as viewed in Fig. 13, by a spring 126 positioned in the bored opening 122 and abutting the left-hand end of rack bar 121, as the latter is viewed in Fig. 13. The end of the spring 126 abutting the rack bar 121 is received in a bore 127 in the left-hand end of the rack bar. The other end of the spring 126 is received in a bored opening 128 of a cap member 129 fixed to a boss on the support member 110 by bolts or other suitable means passing through a flange 131 on the cap. The opening 128 is aligned with the opening 122. The right-hand end of the rack bar 121, upon movement of the holder to its extreme right-hand position from the left-hand position shown in Fig. 13 where the spring 126 is compressed and the holder 116 is in its innermost position, moves into a cap 133 similar to the cap 129. The cap 133 has a bored opening 134 in alignment with the bore 122 and a flange 135 for use in connecting the cap in the bore of the support member by any conventional means. The outer end of the cap 133 mounts an adjustable stop screw 136 for determining the maximum outward movement of the rack bar 121 and, in turn, the movement of the tool holder 116 away from the opening 114.

The rack bar 121 is continuously in mesh with a pinion 138 fixed to a vertical shaft 139 in a vertical bore 140 in the support member 110. The upper end portion 141 of the vertical shaft 139 is of reduced diameter and has a key slot 142 therein. A washer 143 is assembled on the reduced end portion 141 adjacent the shoulder 144 at the inner end of the reduced portion 141. A gear 145, having a hub 146, is supported on the reduced end portion 141 outwardly of, and in abutting engagement with, the washer 143 and has a keyway for receiving a key 147 supported in the key slot 142 in the shaft 139. An antifriction bearing 148 is pressed on the hub 146, and the hub and the bearing are received in a counterbore 149 in the support member 110. The lower side of the antifriction bearing 148 abuts the washer 143 and a shoulder formed in the counterbore 149. The bearing 148 supports the upper end of the shaft 139 and the gear 145 for rotational movement with respect to the support member 110.

The lower end of the shaft 139 is supported for rotational movement by an antifriction bearing 150 mounted in a bore of a cap 151 having a flange for use in securing the cap to the support member 110. The inner race of the bearing 150 is mounted on a reduced portion of the shaft 139 and abuts a shoulder at the inner end of the reduced portion.

An internal gear 153 is fixed to the upper side of the gear 145 coaxially therewith by means of screws 154 and dowel pins 155. The purpose of the internal gear 153 will be described in detail hereinafter.

The gear 145 is continuously in mesh with a rack bar 157 slidably supported in a horizontal bore 157a in an upper support member 158 which is fixedly mounted on the lower support member 110. The rack bar 157 extends parallel to the rack bar 121 and is normally urged to an extreme left-hand position, as viewed in Fig. 13, by a spring 159 positioned within a bore 160 in the rack bar, which bore has its axis offset from the center line of the rack bar 157. The offsetting of the bore 160 provides sufficient wall thickness for forming the rack teeth of the rack bar, thereby enabling the diameter of the rack bar to be maintained at a minimum. The outer end of the spring 159 is positioned in a bore 161 of a cap member 162, the bore 161 being in alignment with the bore 157a in the upper support member. The cap 162 has a flange 163 for use in securing the cap to the upper support member. When the rack bar 157 moves from its right-hand position illustrated in Fig. 13 wherein the spring 159 is compressed to its extreme left-hand position, it moves into a bore 164 of a cap 165 having a flange 166 for securing the cap to the upper support member 158, the bore 164 being aligned with the bore 157a of the upper support member. It will be noted that when the tool holder T is in its most inward position, the rack bars 121, 157 are in their extreme left-hand and right-hand positions, respectively, and the springs 126, 159 are compressed, and movement of the rack bars under the urging of the springs 126, 159 will cause the tool holder to swing outwardly from the innermost position shown to move the tool away from the axis of the opening 114. The outward movement of the tool holder 116 is limited by the engagement of the rack bar 121 with the inner end of the stop screw 136 in the cap 133.

A head member 170 is rotatably supported at the upper end of the upper support member 158. The head member 170 is supported for rotation with respect to the upper support member 158 by an antifriction bearing 171 supported on a hub 172 of the head 170, the bearing 171 being positioned in a counterbore 173 opening into the upper end of the upper support member. The inner race of the bearing 171 is clamped between a shoulder on the hub 172 and a shouldered washer 174 secured to the lower end of the hub 172 by screws passing through the hub. The outer race of the bearing 171 abuts a shoulder in the counterbore 173 at its lower end and is held against the shoulder by a split locking ring 175 engaging the upper end of the bearing.

The head member 170 has a central bore 176 through the hub 172, the axis of the bore 176 being offset from the vertical axis 139 for reasons which will appear hereinafter. A shaft 177 is rotatably mounted in the bore 176, the bore forming a bearing for the shaft. The lower end of the shaft 177 extends below the hub 172 and has a pinion 178 formed integral therewith. The pinion 178 is continuously in mesh with the internal gear 153. It can now be seen that the axis of the shaft 177 and the bore 176 is offset to permit the proper meshing of the pinion 178 is the internal gear 153 and that the shaft 177 will rotate in timed relation to the shaft 139 with which the internal gear 153 rotates.

The upper portion of the shaft 177 extends upwardly from the head member 170 and has a worm wheel 180 fixed thereto by a key 181. The portion of the shaft supporting the worm wheel 180 is of reduced diameter, and the worm wheel abuts the shoulder formed at the inner end of the reduced diameter and is held thereagainst by a washer 182 and a screw 183 which threads into the upper end of the shaft 177.

The worm wheel 180 is continuously in mesh with a worm 184 keyed to a horizontal shaft 185. The shaft 185 is rotatably supported by spaced ears 186, 187 extending upwardly from the head 170. The shaft 185 is formed with a shoulder 188 which abuts the outer side of the ear 186 and the shaft extends outwardly of the shoulder 188 to approximately the circumference of the head member 170 and is provided with a fitting for connecting a wrench thereto, in this instance, a slot 190. The shaft 185 extends through the ears 186, 187, and the portion of the shaft extending outwardly from the ear 187 is threaded to receive a nut for forming a shoulder which abuts the ear 187 thereby preventing endwise movement of the shaft.

As shown in Fig. 19, the ear 187 is provided with a slot 191 extending from one side thereof into the bearing opening for the shaft 185. The slot 191 provides upper and lower clamp jaws 192, 193 in the ear 187. A clamp screw 194 passes through the upper clamp jaw 192 and threads into the lower clamp jaw 193. When the clamp screw 194 is tightened a shoulder 195 thereon, which engages the upper clamp jaw 192, causes the upper clamp jaw to move toward the lower clamp jaw 193, and a clamping pressure is applied to the shaft 185 which will prevent rotation of the shaft and of the worm 184. It will be noted that, when the clamp screw 194 is loosened, the worm 184 may be rotated by means of a wrench G applied to the shaft 185 to adjust the relative position of the head member 170 to the shafts 177, 139 and, in turn, to the tool holder 116. After the parts have been relatively adjusted, the clamp screw is again tightened to lock the worm against rotation and to prevent relative rotation between the worm gear and the worm.

When the rotatable head member 170 is in a predetermined position with respect to the upper support member 158, it may be locked against rotation with respect to the upper support member by means of a pull pin 196. The pull pin 196 is located in a bore 197 in the upper support member 158 below the head member 170 and is biased toward the underside of the head member 170 by a spring 198 positioned in the bore 197. When the head member 170 is in a predetermined position with respect to the upper support member 158, the pin 196 is received in a recess 200 in the underside of the head member. The pull pin 196 also includes a shank 201 which extends downwardly from the pin through the support member 158 and has a knob 202 fixed to the lower end. The knob 202 has a vertically extending locating pin 203 mounted on the upper side thereof which, in the position shown in Fig. 15, clears the side wall of the upper support member 158 and permits inward movement of the pull pin. The knob 202, however, can be rotated when the pull pin is withdrawn against the action of the spring 198 to cause the locating pin 203 to engage the underside of the upper support member 158 and prevent the pull pin 196 from moving inwardly against the head member 170, or into the recess 200 in the head 170. If, however, it is desired to position the pull pin 196 in the recess 200, the knob 202 is rotated to permit the locating pin 203 to clear the underside of the upper support member 158 and allow inward movement of the pull pin 196 into the recess 200.

The head member 170 is formed with a cylindrical side wall 204 and a radially extending flange 205 at the lower end of the side wall. A plurality of abutment rings or disks 206, 207, 208, 209 are coaxially assembled on the head member 170. The rings 206—209 are supported on the head member 170 for angular adjustment with respect thereto and spacer washers are provided intermediate the respective rings. Each of the washers 210 are provided with a tongue 211 which projects into a vertical groove 212 in the cylindrical side wall 204 of the head member 170, thereby preventing rotation of the washers when the rings 206—209 are rotated for purposes of adjustment. The lower ring 209 rests on the flange 205 at the lower end of the side of wall 204 and the upper ring 206 is engaged by a clamp ring 213 mounted in a cutout portion of the head member 170 and overlapping the ring 206. The clamp ring 213 can be tightened against the upper ring 206 to apply a clamping force between the ring and the flange 205 to prevent accidental rotation of the rings after their angular adjustment on the head member 170 by tightening nuts 216 which thread onto studs 217 threaded into the head member 170, the studs extending upwardly through the clamp ring 213.

The rings 206—209 are each formed with radial abutments 218 on the outer circumference thereof each of which is adapted to be engaged by a respective one of a plurality of pawls 220, 221, 222, 223. The pawls 220—223 are supported for individual rocking movement about a vertical rock shaft 225 mounted in a bracket 226 fixed to the upper support member 158 and extending upwardly therefrom. The pawls 220—223 are each engaged by an individual spring-biased plunger 227 slidably supported in a bore in an arm 228 of the bracket 226. The inner end of each of the plungers 227 is formed with a shoulder which slides in a counterbore 229 in the arm 228 and is engaged by a spring 227a positioned in the counterbore. The counterbores 229 are respectively closed by threaded plugs 230. The action of the spring-biased plungers are such that the pawls 220—223 are yieldably urged into engagement with their respective rings 206—209.

The abutment rings 206—209 are formed so that the pawls 220—223 will ride on the circumference thereof when the rings are rotated in a clockwise direction, as viewed in Fig. 14, until the pawl portion engages the abutment 218 on the particular ring. When the pawl engages the abutment, the ring, and in turn the head member 170, will be held against rotative movement as in the first-described embodiment.

Each of the pawls 220—223 have a portion 231 extending rearwardly of the vertical shaft 225. The portions 231 each mount a roller 232 adapted to be engaged by a dog 233 supported adjacent the path of movement of the rollers 232. It will be remembered that the rollers 232 move axially of the workpiece being turned along with the tool T. A dog 233 is provided for actuating each of the pawls 220—223, and the dogs are adjustably supported in grooves 234 in a supporting bar 235 extending parallel to the ways of the bed and the axis of the spindle.

The supporting bar 235 is backed by a backing member 236 made in the form of a yoke and secured to the cap 165, which has been described above. The backing member 236 has a pin 237 mounted in the upper end thereof with the head of the pin engaging the rear side of the supporting bar 235. The backing member 236 prevents swaying movement of the supporting bar 235 when the dogs mounted thereon engage the rollers of the pawls and retains the supporting bar in its position parallel to the axis of the ways of the bed of the machine.

The supporting bar 235 is secured to the headstock of the machine as in the first-described embodiment and, if desired, may be connected to the headstock by a suitable hinged mounting which permits the bar to be swung upwardly to an inactive position. This will permit the supporting bar 235 to be moved to a position where it does not interfere with the operation of tools which may be supported on other faces of the turret F.

In operation, the abutment rings 206—209 are angularly adjusted on the rotatable head member 170 so that the abutments 218 thereon are circumferentially spaced from each other and rotation of the head member 170 will sequentially move the abutments into position to be engaged by their respective pawls 220—223. As each of the pawls engages its respective abutment 218, the rotation of the head member 170 is stopped until the pawl, in engagement with an abutment, is actuated to move the pawl out of engagement with the abutment and permit the springs 126, 159 to rotate the head until the following abutment to be rotated to a position adjacent the pawls is engaged by its respective pawl to again prevent rotation of the head member, thereby causing the tool holder 116 to move in a step-by-step manner in an outward direction transversely of the axis of the workpiece. It will be understood that the dogs 233 are positioned along the supporting member 235 in a manner similar to the first-described embodiment to sequentially actuate the pawls 220—223, as in the first-described embodiment and that the tool T is moved a predetermined distance outwardly from the axis of the work each time a pawl is released to permit rotation of the head member 170 and the outward movement of the tool holder 116.

In the embodiment illustrated in Figs. 13 through 19, the abutment rings 206—209 are provided with indicia, and a pointer bracket 240 is fixed to the upper support member 158 to provide a reference point for setting the abutment rings 206—209.

To set up the machine for operation with the progressive step bar turner, illustrated in Figs. 13 through 19, the tool T is first mounted in the tool holding mechanism 116. After mounting the tool T in the tool holder 116, the knob of the pull-pin 196 is rotated to a position to permit the locating pin 203 to clear the underside of the upper support member 158, and the head member 170 is rotated by hand to a position where the pawl pin moves inwardly into the recess 200 to lock the head member against rotation with respect to the upper support member 158. Movement of the rotatable head member 170 to its position where the pull-pin 196 is engaged causes the tool holder 116 to move inwardly toward the axis of the work and the compression of the springs 126, 159. It will be noted that during the setting-up operation thus far described, the clamp screw 194 is in its clamping position to prevent rotation of the worm 184 thereby locking the rotatable head member 170 and, in turn, the shafts 177, 139 for rotation as a unit.

After the pull-pin 196 is positioned in the recess 200 and the springs 126, 159 compressed, the clamp screw 194 is loosened and the tool T is adjusted by rotating the worm 184 with a wrench applied to the shaft thereof so that the cutting point of the tool is located at the axis of the workpiece. After the tool T has been properly adjusted, the clamp screw 194 is again tightened to prevent relative rotation between the shaft 177 and the rotatable head member 170.

After adjustment of the tool T, the nuts 216 on the studs 217 are backed off to relieve the clamping pressure of clamp ring 213 and to permit free adjusting movement of the abutment rings 206—209 with respect to the rotatable head member 170 and with respect to each other. One of the abutment rings is now adjusted so that its respective pawl will engage the abutment 218 thereon when the tool T moves from the axis of the workpiece outwardly to a position for turning the diameter of the first step on the workpiece. Preferably, the indicia on the abutment rings 206—209 are each such that when the zero mark is aligned with the pointer bracket 240, the abutment 218 thereon is positioned so that the respective pawl will engage the abutment when the tool point is at the axis of the work. Therefore, each abutment ring may be set to be held by its respective pawl when the tool is properly positioned to turn the desired diameter for which the ring is to be preset by rotating the ring so that the indicia indicating such diameter is positioned in alignment with the mark on the pointer bracket 240. Assuming that the ring 206 is set so that the pawl 220 engages the abutment 218 thereon when the tool is in position to turn the first-desired diameter, other rings, for example rings 207, 208, 209, are successively positioned to be engaged by their corresponding pawls when the tool is positioned to turn the successive desired diameters for the remaining steps. It will be noted that the indicia on the abutment rings 206—209 indicate the successive diameters which will be turned upon operation of the machine.

After the abutment rings 206—209 have been adjusted, the nuts 216 are tightened to apply a clamping pressure to clamp ring 213 to prevent rotation of the abutment rings 206—209 relative to the head member 170. After the abutment rings 206—209 are clamped in position, the pull-pin 196 is withdrawn from the recess 200, and the knob 202 is rotated so that the locating pin 203 thereon engages the underside of the upper support 158. The withdrawal of the pull-pin 196 from the recess 200 permits the compressed springs 126, 159 to operate through the racks 121, 157 to rotate the head member 170 until the abutment ring, which is set for the first and smallest diameter to be turned, is engaged by its respective pawl. Since the tool holder 116 is connected to the rack 121 for movement therewith, as the head member 170 is rotated to its position where the abutment ring determining the first diameter is engaged by its pawl, the tool holder 116 is moved outwardly to the proper position for turning the first diameter. The diameter which will be turned is indicated by the indicia of the abutment ring.

After setting the abutment rings 206—209 and releasing the pull-pin 196 so that the head member has rotated to its first position where further rotation thereof is arrested by engagement of the abutment ring set for the first diameter with its respective pawl, the machine is operated to feed the hex turret F and the tool T axially of the workpiece W to turn the workpiece to the first diameter, which is the smallest diameter of those to be turned. The tool is fed axially of the workpiece until it has traversed a distance equal to the desired length of the first diameter to be turned. After it has traversed this distance, the feed of the hex turret is stopped and the dog 233 for actuating the pawl 220 is adjustably moved along its supporting groove 234 in the supporting bar 235 until it engages the roller 232 on the pawl 220 and moves the roller and the pawl in a clockwise direction, as viewed in Fig. 14, about the rockshaft 225 against the bias of its biasing spring. As soon as the pawl 220 is moved sufficiently to clear the abutment 218, the dog 233 is properly positioned for actuating the pawl 220 and the head member will immediately rotate until the pawl 221 engages the abutment 218 on the abutment ring 207 to again stop the rotation of the head member 170. The dog 233 for actuating the pawl 220 is then locked in place to prevent the shifting thereof from its proper position. Simultaneously with the rotation of the head member 170, the tool T will have been moved outwardly of the axis of the workpiece a distance determined by the rotation of the head member 170 which is, in turn, determined by the angular spacing between the abutment 218 on the abutment ring 206 and the abutment 218 on the abutment ring 207. The tool is now positioned to turn the second diameter and the feed for the hex turret is again engaged to feed the hex turret axially of the workpiece to turn the workpiece to the second-desired diameter. After the tool T has moved axially of the workpiece the desired distance, while turning the second diameter, the feed of the turret F is again interrupted and the dog 233 for operating the pawl 221 is set in the same manner as the dog for operating the pawl 220. The above procedure is then repeated to set the remainder of the dogs for actuating the pawls 222, 223 to move the tool outwardly of the axis to successively turn different diameters. When the last diameter is turned, the pawl 223 is actuated to permit rotation of the head member 170 and movement of the tool T to a position clear of the work.

After all the dogs 233 for actuating the pawls 220—223 have been set in the above-described manner, the machine is set up to repeatedly turn progressively-stepped workpieces in accordance with the setting on the abutment rings 206—209 for the different diameters and the dogs 233 for the different lengths to be machined at the different diameters.

A thrust-resisting means 90' is carried by the lower support member 110 and comprises spaced rollers 91' adapted to engage the circumference of the unturned workpiece ahead of the tool T. The thrust-resisting means 90' and the rollers 91' are of a construction similar to that shown in the first-described embodiment and the description thereof will not be repeated.

One advantage of the construction of the second-described embodiment is that the tool T may be readily removed from the tool holder 116 for such purposes as grinding the cutting edges thereof and subsequently replaced in the tool holder 116 without disturbing the setting of the rings 206—209, and so adjusted after replacement that the tool will be properly positioned with respect to the rings 206—209 and the abutments thereon and no adjustment has to be made in the settings of the rings to turn a workpiece having the same stepped diameters as workpieces previously turned before the removal of the tool T. Conveniently, the tool may be removed from the holder 116 after the machining of a workpiece has been completed, the spindle stopped, and the hex turret returned to a position clear of the work. In this position, the tool T is readily removable from the tool holder 116 and, after grinding, easily replaceable therein. After the tool T has been replaced in the tool holder 116, the hex turret is moved so that the tool T is adjacent one of the diameters of the workpiece, for example, the first step. The head member 170 is then rotated by hand in a clockwise direction, as viewed in the drawings, until the pawl, which determines the first diameter, engages the abutment 218 on the corresponding abutment ring. Rotation of the head 170 to this position compresses the springs 126, 159 and simultaneously moves the tool T toward the axis of the workpiece into position to turn the first diameter. Any necessary adjustment of the tool T with respect to the work axis can now be effected by loosening the clamp screw 194 and rotating the worm 184 to move the tool holder 116 relative to the head member 170 to cause the tool to engage the outer circumference of the previously finished workpiece which has been left in the work spindle. After adjustment, the worm shaft 185 is again clamped to prevent rotation of the worm.

The wrench which is used to rotate the worm shaft 185 may be provided with indicia marks 241 at its inner end. As the wrench is rotated, the marks 241 are moved relative to an indicia mark 241a on a cover for the head member 170. By noting the indicia marks 241 aligned with the mark 241a before and after rotation of the wrench, the amount of adjustment can be readily determined. Preferably, the indicia marks indicate one-thousandths of an inch movement of the tool T.

In the embodiment of the invention illustrated in Figs. 20 and 21, the rockable member 117 of the tool holder 116 is replaced by a slide 244 which is movable horizontally toward, and away from, the axis of the work. The mechanism for supporting and moving the slide 244 is of the same construction as the embodiment of Figs. 13 through 19 with certain exceptions which will be pointed out in detail, and the parts of the embodiment of Figs. 20 and 21 have been given the same reference numeral with a prime mark affixed thereto as their corresponding parts in the embodiment illustrated in Figs. 13 through 19. Referring to Figs. 20 and 21, the slide 244 is supported on the lower support member 110' by a horizontal slideway 245 for movement in a radial direction toward, and away from, the workpiece. The slide 244 is moved on the slideway 245 by a rack bar 121' corresponding to the rack bar 121 of the first-described embodiment but having a rectangular cross-section. The rack bar 121' is fixed to the slide 244 by screws 246. The tool T is removably mounted on the slide 244 by any suitable means.

The slide 244 is moved toward, and away from, the axis of the work upon rotation of the shaft 139' which is operatively connected to the rack bar 121' by a pinion 138'. The rotation of shaft 139' is controlled to move the tool T away from the workpiece W in a step-wise manner to turn steps on the workpiece in the same manner as the shaft 139 of the second-described embodiment.

While the slide member 244, as illustrated, has a plurality of surfaces contacting with its supporting guideway, it will be understood that suitable antifriction means may be provided to reduce the friction of the sliding member on the guideway, the friction of a slide on a guideway being normally greater than the friction of the rockable tool holder 116 on its bearing pin of the second-described embodiment.

It can now be seen that the objects heretofore enumerated have been accomplished and that the present invention provides a new and improved machine tool in which a movable member, such as a tool holder, can be automatically successively and accurately moved radially of the work to a plurality of predetermined positions in accordance with its movement in a predetermined direction by a compact, simple mechanical mechanism. The invention is particularly suitable for use in lathes for successively moving the cutting tool in a direction away from the workpiece at particular points along the length of the work-piece to form a step at that point. The mechanism for moving the tool includes motive means for continuously urging the tool away from the workpiece, and releasable latching means for preventing rotation of a rotatable element positively driven by the motive means to prevent operation of the motive means, and the latching means being successively actuatable to permit successive operations of the motive means to move the tool away from the axis of the workpiece in a step-wise manner.

While preferred embodiments of the present invention have been described in considerable detail, it is hereby my intention to cover all modifications, constructions and arrangements which fall within the ability of those skilled in the art and the scope of the appended claims.

Having thus described my invention, I claim:

1. In combination with a machine tool having a tool supporting member supported for reciprocable movement along a predetermined path, a rack bar means operatively connecting said rack bar to said member for reciprocating the member upon reciprocation of the rack bar, a rotatable shaft, gearing operatively and positively connecting said shaft to said rack bar for rotation of said shaft upon movement of said rack bar, a movable member, means positively connecting said movable member to said shaft for movement thereby upon rotation of said shaft, spring motor means operatively connecting said motor to said rack bar to yieldably urge said rack bar to move said tool supporting member in one direction along said path and tending to move said movable member in one direction, said movable member having a plurality of spaced abutments thereon engageable to prevent movement of said movable member in the direction which it is urged by said spring motor whereby operation of said rack bar by said spring motor is prevented, a plurality of pawls, means supporting said pawls adjacent to said movable member for engaging said abutments to prevent movement of the movable member and for movement to a position clear of said abutments, each of said pawls engaging only one of said abutments, and means for yieldably urging said pawls into engagement with said movable member, said means positively connecting said movable member and said shaft comprising means to adjust the relative position of said shaft and said movable member.

2. In a machine tool, a frame, a first member supported on said frame for movement in a first direction, a second member supported on said first member for movement in a second direction angularly related to said first direction, means for moving said second member in said second direction comprising a motor on one of said members and tending to continuously operate in one direction, means operatively and positively connecting said motor to said second member to drive said second member in said second direction whereby said second member is continuously urged in said second direction, a rotatable element on one of said members, drive means operatively and positively interconnecting said rotatable element with said motor for rotation thereby upon the operation of the latter and whereby said motor can operate only when said elements is free to be driven thereby, first abutment means and second abutment means, one of said abutment means comprising a plurality of angularly spaced abutments spaced along the outer circumferential periphery of said rotatable element in its direction of rotation, means supporting said first and second abutment means comprising first means mounting one of said abutment means to said rotatable element for rotation therewith as a unit and second means mounting the other of said abutment means adjacent to said rotatable element in the path of the said abutment means on said rotatable element and in a position to engage the abutment means on said rotatable element when the latter is in any one of a plurality of angular positions, the said means for supporting said first abutment means including means movably supporting the first abutment means for movement clear of the second abutment means and including means yieldably urging the first abutment means into position to engage said second abutment means, and means supported along the path of movement of said first member in said first direction for actuating said first abutment means to clear said second abutment means and release said motor for operation.

3. In a machine tool, the structure as defined in claim 2 wherein said drive means includes means for adjusting the relative angular position of said rotatable element with respect to said motor.

4. In a machine tool, the combination as defined in claim 3 wherein said drive means includes normally non-rotatable meshed gearing elements, means supporting said gearing elements for selective relative rotation to adjust the position of said rotatable element with respect to said motor, means operatively connecting one of said gearing elements to said rotatable element for rotation therewith, means operatively connecting the other of said gearing elements to said motor for actuation thereby, and means connected to said gearing elements for selectively rotating said gearing elements.

5. In a machine tool including a first member, and a support member supporting said first member for movement in a first direction, the combination of means for moving said first member with respect to said support member in said first direction comprising a motor on one of said members tending to continuously operate in one direction, drive means operatively and positively connecting said motor to said first member to continuously urge and drive said first member in said first direction, a movable element, drive means operatively and positively interconnecting said movable element with said motor for movement thereby upon operation of said motor and whereby said motor can operate only when said element is free to be driven thereby, latching means engageable with said movable element when said element is in any one of a plurality of angular positions to arrest the movement thereof and comprising a plurality of latching levers, a plurality of abutment means on and rotatable with said movable element and each engageable to arrest operation of said movable element and adapted to be engaged by respective ones of said levers, and means supporting said levers in positions adjacent said element and normally in position to engage the respective ones of said abutments when the latter are in a predetermined position and for movement clear of said abutments, the relative positions of said levers and abutments being such that said abutments are engaged by their corresponding levers in different angular positions of said element.

6. In a machine tool including a first member movable in a first direction, the combination of means for moving said first member in said first direction comprising a motor, said motor tending to operate continuously in one direction, means operatively connecting said motor to said member to urge and positively drive said member in said first direction, a rotatable element, drive means operatively and positively connecting said rotatable element to said motor for rotation thereby upon operation of said motor and whereby said motor can operate only when said element is free to be driven thereby, a plurality of rotatable rings, individual means operatively connecting said rings to said rotatable element for rotation therewith and for angular adjustment with respect thereto, each of said rings having abutment means thereon, a plurality of latching levers each adapted to engage the abutment means on a respective one of said rings to prevent rotation of said rotatable element, means supporting each of said latching levers adjacent said rotatable element for movement from a position to engage the abutment on its corresponding ring to a position clear of the ring and abutment, and means yieldably urging said latching levers to their positions for engaging said abutments, said levers normally being in their positions for engaging said abutments.

7. In a machine tool, a movable member, a support member for movably supporting said movable member, means tending to continuously and positively move said movable member along a predetermined line of movement with respect to said support member comprising a motor on one of said members, drive means operatively connecting said motor to said movable member to drive said movable member comprising first and second meshed gearing elements operatively connected to said motor and to said movable member, a plurality of rings, rotatable supporting means mounting said rings for rotation about an axis, said rings being adjustable relative to said supporting means and about said axis, drive means positively connecting said motor to said rings to rotate said rings upon operation of said motor, each of said rings having an abutment means on the periphery thereof, an individual pawl for each of said rings adapted to engage the abutment means thereon to prevent rotation of said ring and operation of said motor, means supporting each of said pawls in position to engage the abutments of the corresponding ring and including means supporting said pawls for movement from said positions to positions clear of the abutment means on said rings, said pawls normally being in position to engage said abutment means on said rings.

8. In a machine tool, the structure as defined in claim 7 wherein each of said pawls is urged to a position to engage the corresponding abutment by a spring.

9. In a machine tool, a first member, a support member supporting said first member for movement in a first direction with respect thereto, a motor tending to operate continuously in one direction, motion transmitting means operatively and positively connecting said motor to said first member to drive said first member in said first direction, a rotatable element, a gear train operatively and positively connecting said rotatable element to said motion transmitting means for rotation thereby upon operation of said motor, said gear train including means for adjusting the relative angular position of said rotatable element with respect to said motion transmitting means, angularly spaced abutments carried by said rotatable element for rotation thereby, latch means for engaging each of said abutments, upon rotation thereof to a predetermined position to arrest rotation of said rotatable element, means supporting the last said means adjacent said rotatable element and in position to be effective upon rotation of any said abutments to their said predetermined positions and for movement to a position clear of said abutments, and means yieldably urging said latch means toward engagement with said abutments.

10. The mechanism as defined in claim 9 wherein said means for engaging said abutments comprises a plurality of pawls, each of said abutments being engaged by a different one of said pawls.

11. In a machine tool, the structure as defined in claim 9 wherein said motion transmitting means comprises a gear train.

12. In a machine tool, the structure as defined in claim 10 wherein said motion transmitting means is a gear train.

13. In a machine tool having a first member, a support member for said first member supporting said first member for movement along a predetermined path, a motor tending to operate continuously in one direction, motion transmitting means operatively positively connecting said motor to said first member and actuatable by said motor to move said first member in one direction along said path upon operation of the motor, a rotatable element, drive means operatively and positively connecting said rotatable element to said motion transmitting means for rotation thereby upon operation of said motor, said drive means including a rotatable shaft and means positively connecting said shaft to said motion transmitting means for rotation thereby and worm gearing interconnecting said shaft and said rotatable element, means supporting said worm gearing for selective relative rotation, means for selectively rotating said worm gearing to rotate said shaft relative to said rotatable element, and means engageable with said rotatable element to hold the latter against rotation when the latter is in a predetermined position.

14. In a machine tool, the structure as defined in claim 13 wherein the last said means comprises a plurality of angularly spaced abutment means fixed to said rotatable element for rotation therewith and stop lever means supported adjacent said rotatable element for engagement with said abutment means when said rotatable element is in predetermined positions.

15. In combination with a machine tool having a first member supported for reciprocable movement along a predetermined path, a rack bar, means operatively connecting said rack bar to said member for reciprocating the member upon reciprocation of the rack bar, a rotatable shaft, gearing operatively and positively connecting said shaft to said rack bar to rotate said shaft upon movement of said rack bar, a movable member, means positively connecting said movable member to said shaft for movement upon rotation of said shaft, a spring motor, means operatively connecting said spring motor to said rack bar to yieldably urge said rack bar to move said first member in one direction and to move said movable member in one direction, said movable member having a plurality of spaced abutments thereon movable therewith, a plurality of pawls, means supporting said pawls adjacent said movable member in positions to engage respective ones of said abutments when the latter are in respective predetermined positions and for movement therefrom to positions clear of said abutments, and means engaging each of said pawls and yieldably urging said pawls to their first-said positions.

16. In combination, the structure as defined in claim 15 wherein said movable member is a rotatable member and said means positively connecting said rotatable member and said shaft comprises a worm and worm gear normally fixed against rotation with respect to each other and transmitting rotation to said rotatable member while so fixed, the structure further comprising means supporting said worm and worm gear for relative rotation, and means for selectively rotating said worm and worm gear.

17. In combination with a machine tool having a movable member supported for reciprocable movement along a predetermined path, a rack bar, means operatively connecting said bar to said movable member for reciprocating the member upon reciprocation of the rack bar, a shaft, means rotatably supporting said shaft, gearing operatively connecting said shaft to said rack bar for rotation of said shaft upon movement of said rack bar, a rotatable head member, means positively connecting said rotatable head member to said shaft for rotation therewith, a spring motor, means operatively connecting said motor to said rack bar and urging said rack bar to move said movable member in one direction along said path and tending to rotate said head member in one direction, a plurality of rings supported on said rotatable head member for angular adjustment with respect thereto, each of said rings having an abutment thereon engageable to prevent rotation of said head member in the direction which said spring motor tends to rotate the head member whereby operation of said rack bar by said spring means is prevented, a plurality of pawls, means supporting said pawls adjacent said head member to engage said abutments when opposite said pawls to prevent rotation of the head member and for movement clear of said abutments, each of said pawls engaging only one of said abutments, and means for yieldably urging said pawls into engagement with said rings.

18. In a machine tool, a tool supporting member, means pivotally supporting said member for rocking movement in either direction along a predetermined path, a rack bar, means operatively connecting said member and bar for reciprocating the member upon reciprocation of the rack bar, a shaft, means rotatably supporting the shaft, gearing operatively connecting said shaft to said rack bar for rotation of said shaft upon movement of said rack bar, a rotatable head member, drive means positively connecting said rotatable head member to said shaft for rotation therewith, a spring motor, means operatively connecting said motor to said rack bar to urge said rack bar to move said tool supporting member in one direction along said path and tending to rotate said head member in one direction, a plurality of rings fixed to said rotatable head member for rotation therewith and for angular adjustment with respect thereto, each of said rings having an abutment thereon engageable to prevent rotation of said head member in the direction which said spring means tends to rotate the head member whereby operation of said rack bar by said spring means is prevented, a plurality of pawls, means supporting said pawls adjacent said head member and in position to engage said abutments when opposite said pawls to prevent rotation of the head member and for individual movement clear of said abutments, each of said pawls engaging only one of said abutments, and means for yieldably urging said pawls into engagement with said rings.

19. In a machine tool, a first member, a support member supporting said first member for movement in a first direction with respect thereto, a motor tending to operate continuously in one direction, motion transmitting means operatively and positively connecting said motor to drive said first member in said first direction, a rotatable element, drive means operatively and positively connecting said rotatable element to a part of said motion transmitting means which is moved to transmit power from said motor to said first member, said drive means effecting rotation of said rotatable element upon movement of said part and including means for adjusting the relative positions of said element and said part, and means normally engageable with said element when the latter is in any one of a plurality of predetermined positions for arresting movement thereof and selectively actuatable to release said element for movement.

References Cited in the file of this patent

UNITED STATES PATENTS

| | | |
|---|---|---|
| 1,965,541 | Bullows | July 3, 1934 |
| 2,032,598 | Shaws | Mar. 3, 1936 |
| 2,174,552 | Collins | Oct. 3, 1939 |
| 2,429,938 | Mansfield | Oct. 28, 1947 |
| 2,641,151 | Lee | June 9, 1953 |

FOREIGN PATENTS

| | | |
|---|---|---|
| 477,827 | Italy | Feb. 9, 1953 |
| 632,611 | Great Britain | Nov. 28, 1949 |
| 783,151 | Great Britain | Sept. 18, 1957 |
| 902,456 | France | Aug. 31, 1945 |

UNITED STATES PATENT OFFICE
CERTIFICATION OF CORRECTION

Patent No. 2,968,981                                          January 24, 1961

Wilbur C. De Graff, deceased,
by Margaret M. De Graff, executrix

It is hereby certified that error appears in the above numbered patent requiring correction and that the said Letters Patent should read as corrected below.

Column 16, line 11, after "bar" insert a comma; line 19, after "motor" insert a comma; same column 16, line 53, for "elements" read -- element --; column 18, line 36, after "abutments" strike out the comma.

Signed and sealed this 18th day of July 1961.

(SEAL)
Attest:

ERNEST W. SWIDER                                        DAVID L. LADD

Attesting Officer                                         Commissioner of Patents